R. B. COWPERTHWAITE.
BERRY PICKER.
APPLICATION FILED SEPT. 13, 1915.
1,197,710.
Patented Sept. 12, 1916.
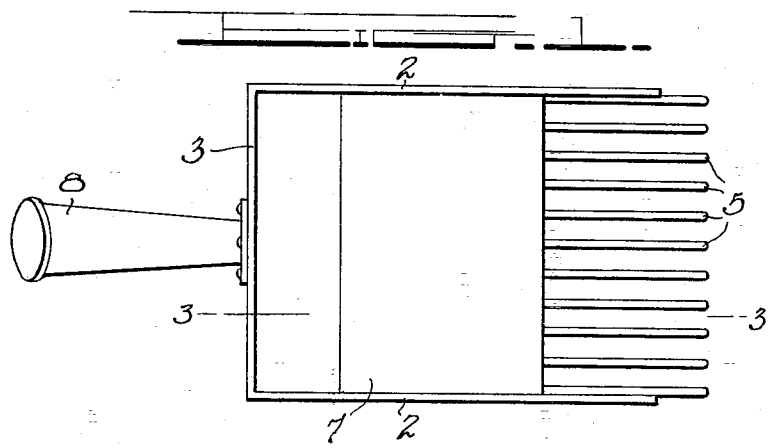
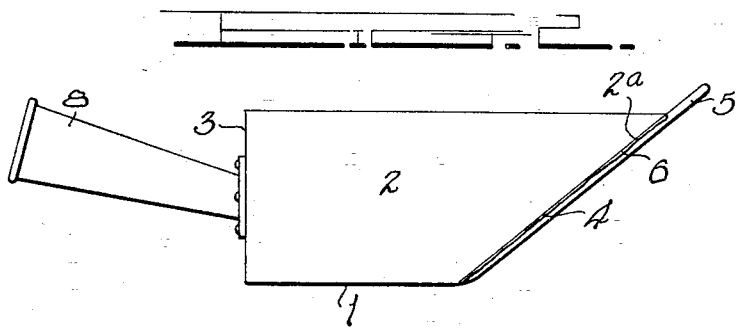
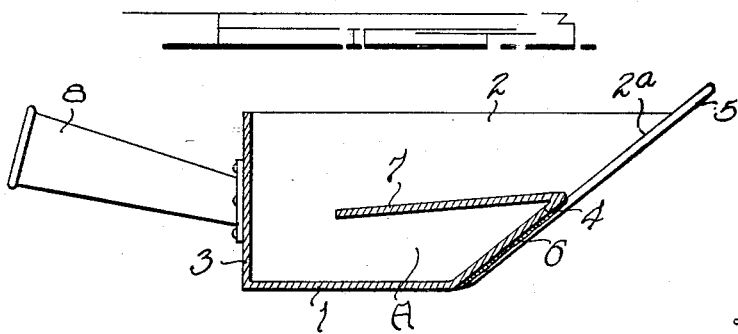
Inventor
R. B. COWPERTHWAITE
By  J. S. Hill
Attorney

UNITED STATES PATENT OFFICE.

ROBERT B. COWPERTHWAITE, OF BIRCH HARBOR, MAINE.

BERRY-PICKER.

1,197,710.  Specification of Letters Patent.  Patented Sept. 12, 1916.

Application filed September 13, 1915. Serial No. 50,385.

*To all whom it may concern:*

Be it known that I, ROBERT B. COWPERTHWAITE, a citizen of the United States, residing at Birch Harbor, in the county of Hancock, State of Maine, have invented a new and useful Berry-Picker; and I do hereby declare the following to be a full, clear, and exact description of the invention, such as will enable others skilled in the art to which it appertains to make and use the same.

The present invention relates to a device for picking berries, and has for its object to provide a berry picking rake which embodies novel features of construction whereby the berries can be properly retained during successive picking operations until there has been an accumulation of berries, when the berries may be turned into a large bucket or receptacle, such a construction admitting of the berry picker being used upon low bushes such as highland cranberries without the necessity of turning the berries from the picker into the bucket at each manipulation of the picker.

Further objects of the invention are to provide a berry picker of this character which is simple and inexpensive in its construction, which is light in weight and can be easily handled and manipulated, which will eliminate much of the labor which is usually incident to the use of a picker and enable large quantities of berries to be easily picked in a comparatively short period of time, and which will collect the berries without tearing or mutilating the same.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a top plan view of a berry picker constructed in accordance with the invention. Fig. 2 is a side elevation of the same. Fig. 3 is a longitudinal sectional view through the picker on the line 3—3 of Fig. 1.

Corresponding and like parts are referred to in the following description and indicated in all the views of the drawing by the same reference characters.

The berry picker has the general form of a scoop, the numeral 1 designating the bottom thereof, 2 the sides thereof, 3 the back thereof, and 4 the front thereof. The sides 2 and back 3 have the same height, while the front 4 is comparatively short and has only a fraction of the height of the sides and back. The forward ends of the sides 2 are preferably beveled or cut off at a sharp angle as indicated at $2^a$, and the front 4 is secured to the beveled edges of the sides 2 and correspondingly inclined. Projecting from the upper edge of the front 4 are a series of uniformly spaced and parallel berry picking fingers 5 which extend slightly above the top of the sides 2. These berry picking fingers 5 may be formed of small rods or pieces of wire, and are shown as extending along the outer face of the front 4 and secured thereto in some suitable manner as by the solder 6.

Arranged within the scoop is an interior partition 7 which is spaced from the bottom 1 and extends rearwardly from the upper edge of the front 4, the ends of the partition being secured to the sides 2. This partition is preferably inclined rearwardly and downwardly toward the bottom 1, and the rear edge of the partition is spaced from the back 3, so that a berry receiving chamber A is provided between the bottom and the partition. This berry receiving chamber A is closed at the forward end of the scoop and opens toward the back of the scoop, so that berries will be retained within the chamber when the scoop is in an upright position with the berry picking fingers 5 projecting downwardly. A handle 8 projects rearwardly from the back 3 and is permanently connected thereto in some suitable manner.

In the use of the device the berry picking fingers 5 provide a rake or comb which is drawn through the berry bushes or vines in such a manner as to disengage the berries and cause them to be collected within the scoop, the spaces between the fingers 5 being sufficient to receive the branches or strands of the bushes or vines without permitting the berries to pass through the same. After each manipulation of the scoop, the berries may be brought into the chamber A by tilting the front end of the scoop upwardly a sufficient amount to cause the berries to roll rearwardly upon the partition 7. The berry picker may thus be successively manipulated and the berries collected in the scoop until the chamber A is filled, when the berries from the chamber may be poured through one of the rear corners of the scoop into a large bucket or receptacle. When picking berries from low bushes or vines, this construction will be found particularly advantageous, since it eliminates the necessity of turning the berries from the scoop into the large bucket each time the picker is manipulated. In the absence of some form of berry collecting means such as the chamber A this would be necessary, as otherwise the berries previously picked would fall out of the scoop as soon as it was again lowered into picking position. The end of the berry picking fingers 5 may be soldered at 9 or otherwise secured to the beveled edges 2ª of the sides 2 so as to reinforce the same.

Having thus described the invention, what I claim as new and desire to secure by Letters Patent, is:—

A berry picker, including a scoop formed with a bottom, sides, back and front, the forward ends of the sides being beveled and inclined upwardly and outwardly from the front of the bottom of the scoop, the front being correspondingly inclined and terminating at a distance below the upper edges of the sides, an interior partition projecting rearwardly from the upper edge of the front and connecting the sides, said interior partition being inclined downwardly from the upper edge of the front toward the bottom of the scoop and being spaced therefrom, and terminating short of the back of the scoop, so as to form a rearwardly opening berry receiving chamber between the bottom and the partition, a series of berry picking fingers projecting from the front and arranged in alinement therewith so as to be angularly disposed in a manner corresponding to the beveled ends of the sides, and a handle projecting from the back.

In testimony whereof I have signed my name to this specification in the presence of two subscribing witnesses.

ROBERT B. COWPERTHWAITE.

Witnesses:
J. W. NOONAN,
M. C. STANLEY.

Copies of this patent may be obtained for five cents each, by addressing the "Commissioner of Patents, Washington, D. C."